United States Patent
Morokuma et al.

(10) Patent No.: US 12,334,807 B2
(45) Date of Patent: Jun. 17, 2025

(54) DRIVE ADJUSTMENT CIRCUIT FOR POWER SEMICONDUCTOR ELEMENT, POWER MODULE, AND POWER CONVERSION DEVICE

(71) Applicant: Mitsubishi Electric Corporation, Tokyo (JP)

(72) Inventors: Kenichi Morokuma, Tokyo (JP); Takuya Sakai, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 231 days.

(21) Appl. No.: 17/927,010

(22) PCT Filed: Jul. 14, 2020

(86) PCT No.: PCT/JP2020/027387
§ 371 (c)(1),
(2) Date: Nov. 22, 2022

(87) PCT Pub. No.: WO2022/013947
PCT Pub. Date: Jan. 20, 2022

(65) Prior Publication Data
US 2023/0198373 A1    Jun. 22, 2023

(51) Int. Cl.
*H02M 1/08*    (2006.01)
*H02M 1/00*    (2007.01)

(52) U.S. Cl.
CPC ........... *H02M 1/08* (2013.01); *H02M 1/0029* (2021.05); *H02M 1/0048* (2021.05)

(58) Field of Classification Search
CPC ..... H02M 1/0029; H02M 1/0048; H02M 1/08
See application file for complete search history.

(56) References Cited

U.S. PATENT DOCUMENTS

2011/0241738 A1   10/2011   Tamaoka

FOREIGN PATENT DOCUMENTS

| JP | 2011-211836 A | 10/2011 | |
| JP | 2017-5565 A | 1/2017 | |
| JP | 2019-80359 A | 5/2019 | |
| WO | WO-2015008461 A1 * | 1/2015 | ........ H02M 7/53803 |

OTHER PUBLICATIONS

International Search Report and Written Opinion mailed on Oct. 6, 2020, received for PCT Application PCT/JP2020/027387, filed on Jul. 14, 2020, 9 pages including English Translation.
Chinese Office Action issued Apr. 18, 2025, in corresponding Chinese Patent Application No. 202080102819.2, 13pp.

* cited by examiner

*Primary Examiner* — Jue Zhang
(74) *Attorney, Agent, or Firm* — XSENSUS LLP

(57) ABSTRACT

A drive adjustment circuit for a power semiconductor element includes a differentiating circuit to differentiate a gate voltage of a power semiconductor element, a power supply to generate a comparison reference voltage, a comparator having a first input terminal connected to the differentiating circuit and a second input terminal receiving the comparison reference voltage, and a voltage adjusting circuit to adjust a gate voltage of the power semiconductor element based on an output of the comparator.

19 Claims, 13 Drawing Sheets ated with a switching speed. A power semiconductor circuit and a
DRIVE ADJUSTMENT CIRCUIT FOR POWER SEMICONDUCTOR ELEMENT, POWER MODULE, AND POWER CONVERSION DEVICE

CROSS-REFERENCE TO RELATED APPLICATION

The present application is based on PCT filing PCT/JP2020/027387, filed Jul. 14, 2020, the entire contents of which are incorporated herein by reference.

TECHNICAL FIELD

The present disclosure relates to a drive adjustment circuit for a power semiconductor element, a power module, and a power conversion device.

BACKGROUND ART

Power semiconductor elements for controlling large power are used in power supply circuits that generate alternating current with different frequencies from direct current or alternating current, or power conversion devices (inverters) having the circuits. When power semiconductor elements are used for inverters and the like, it is necessary to suppress power consumption for reducing greenhouse gas. Methods for reducing energy produced in power semiconductor elements by controlling the power semiconductor elements are known.

For example, PTL 1 describes a method of saving power consumption of a power semiconductor element and increasing a switching speed. A power semiconductor circuit and a power module circuit device in FIG. 1 in PTL 1 prevent gate drive withstand voltage breakdown due to induced voltage, transient voltage, or overshoot voltage caused by an inductance component of wire during turning off, and suppress self-turning on of a power transistor to reduce switching loss.

CITATION LIST

Patent Literature

PTL Japanese Patent Laying-Open No. 2019-80359

SUMMARY OF INVENTION

Technical Problem

However, the power semiconductor drive circuit in PTL 1 fails to control voltage and current in transition operation from the OFF state to the ON state or from the ON state to the OFF state of the power semiconductor element. As a result, the power semiconductor drive circuit fails to reduce switching loss in transition operation.

An object of the present disclosure is therefore to provide a drive adjustment circuit for a power semiconductor element, a power module, and a power conversion device that can reduce switching loss in transition operation.

Solution to Problem

A drive adjustment circuit for a power semiconductor element according to the present disclosure includes a differentiating circuit to differentiate a gate voltage of a power semiconductor element, a power supply to generate a comparison reference voltage, a comparator having a first input terminal connected to the differentiating circuit and a second input terminal receiving the comparison reference voltage, and a voltage adjusting circuit to adjust the gate voltage of the power semiconductor element, based on an output of the comparator.

Advantageous Effects of Invention

According to the present disclosure, the gate voltage of the power semiconductor element is adjusted in accordance with a comparison result between a voltage obtained by differentiating the gate voltage and the magnitude of the comparison reference voltage generated by the power supply, so that the switching loss in transition operation can be reduced.

DESCRIPTION OF EMBODIMENTS

Embodiments will be described below with reference to the drawings. In the following embodiments, similar constituent elements are denoted by the same reference signs.

First Embodiment

Figure 1:
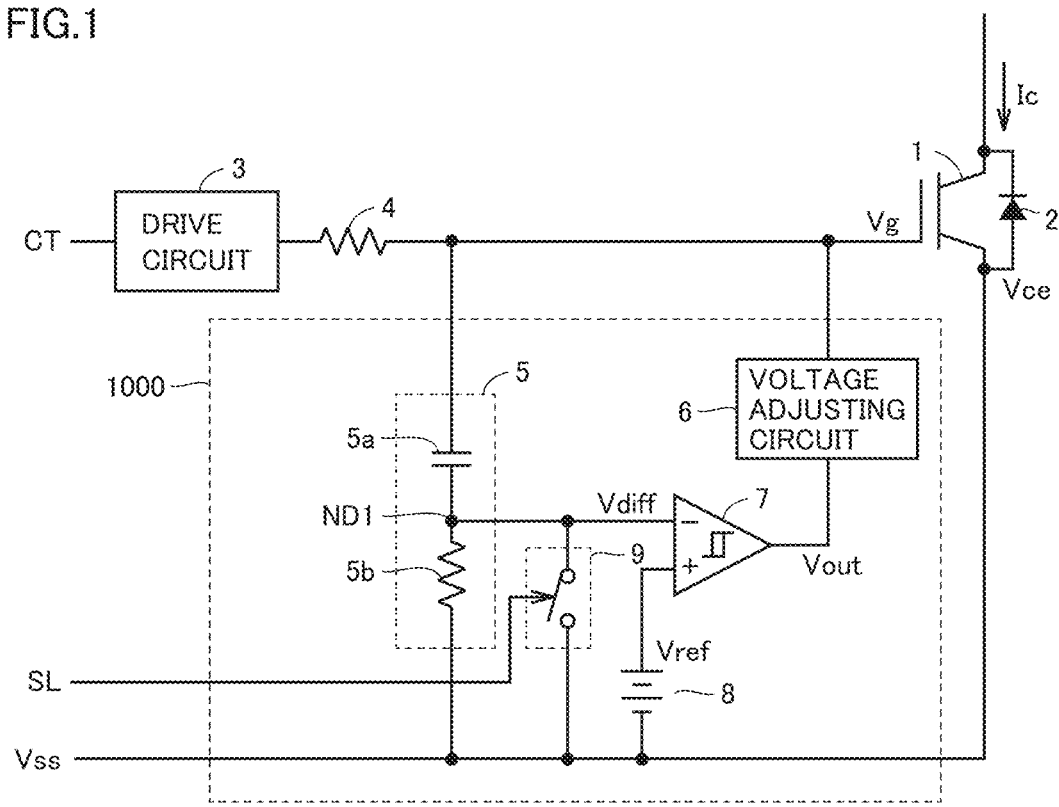
FIG. 1 is a diagram illustrating a drive adjustment circuit 1000 for a power semiconductor element according to a first embodiment.

FIG. 1 is a diagram illustrating a drive adjustment circuit 1000 for a power semiconductor element according to a first embodiment. Drive adjustment circuit 1000 includes a differentiating circuit 5, a comparator 7, a voltage adjusting circuit 6, and a switch 9.

As illustrated in FIG. 1, power semiconductor element is composed of, for example, an insulated gate bipolar transistor (IGBT), a bipolar transistor, or a power metal oxide semiconductor field effect transistor (MOSFET). A freewheeling diode 2 is connected in anti-parallel with power semiconductor element 1. Driving of a drive circuit 3 is controlled by a control signal CT. Drive circuit 3 is connected to a first end of a gate resistor 4. A second end of gate resistor 4 is connected to the gate terminal of power semiconductor element 1. The emitter terminal of power semiconductor element 1 is connected to a reference potential Vss. Vss is a reference potential of power semiconductor element 1.

Differentiating circuit 5 differentiates a gate voltage Vg of the gate terminal of power semiconductor element 1 and outputs a voltage Vdiff. Differentiating circuit 5 includes a capacitor 5a and a resistor 5b connected in series. A first end of capacitor 5a is connected to the gate terminal of power semiconductor element 1. A first end of resistor 5b is connected to reference potential Vss. A second end of capacitor 5a and a second end of resistor 5b are connected to a node ND1. Node ND1 is an output terminal of differentiating circuit 5. Node ND1 is connected to a negative input terminal of comparator 7.

Figure 2:
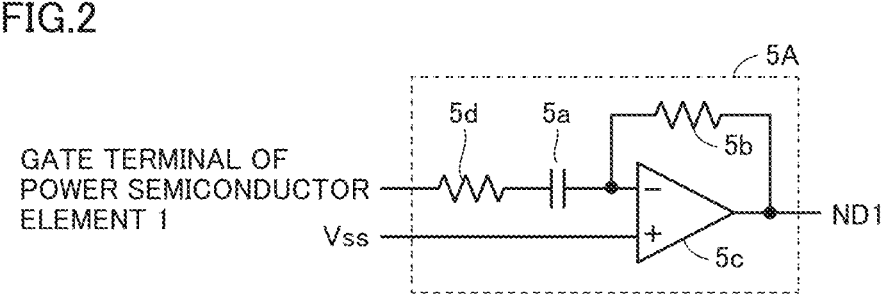
FIG. 2 is a diagram illustrating a configuration of a differentiating circuit 5A.

The configuration of differentiating circuit 5 in FIG. 1 is an example. FIG. 2 is a diagram illustrating a configuration of a differentiating circuit 5A. Differentiating circuit 5A illustrated in FIG. 2 may be used instead of differentiating circuit 5 in FIG. 1.

Differentiating circuit 5A includes a resistor 5d, a capacitor 5a, an operational amplifier 5c, and a resistor 5b. A first end of resistor 5d is connected to the gate terminal of power semiconductor element 1. A second end of resistor 5d is connected to a first end of capacitor 5a. A second end of capacitor 5a is connected to a negative input terminal of operational amplifier 5c. A positive input terminal of operational amplifier 5c is connected to reference potential Vss. Resistor 5b is connected between the negative input terminal of operational amplifier 5c and an output terminal of operational amplifier 5c. The output terminal of operational amplifier 5c is connected to node ND1.

Differentiating circuit 5A illustrated in FIG. 2 can adjust a gain based on the resistance of resistor 5d and the resistance of resistor 5b. The gain is a value obtained by dividing the resistance of resistor 5b by the resistance of resistor 5d.

Referring to FIG. 1 again, a power supply 8 is arranged between the positive input terminal of comparator 7 and reference potential Vss. Power supply 8 generates a voltage Vref (comparison reference voltage).

Comparator 7 includes a negative input terminal connected to node ND1 that is the output terminal of differentiating circuit 5 and a positive input terminal receiving voltage Vref of power supply 8. Voltage Vref of power supply 8 is greater than reference potential Vss. Comparator 7 outputs an output voltage Vout1 at LOW level when output voltage Vdiff of differentiating circuit 5 is greater than voltage Vref of power supply 8. Comparator 7 outputs output voltage Vout1 at HIGH level when output voltage Vdiff of differentiating circuit 5 is smaller than voltage Vref of power supply 8.

Switch 9 is connected between the negative input terminal of comparator 7 and reference potential Vss. Potential Vdiff at the negative input terminal of comparator 7 is controlled by switching of switch 9. As a result, gate voltage Vg of power semiconductor element 1 is controlled.

Voltage adjusting circuit 6 receives output voltage Vout of comparator 7 and adjusts gate voltage Vg of power semiconductor element 1. Voltage adjusting circuit 6 has the function of sinking the gate current of power semiconductor element 1. When comparator 7 indicates that output voltage Vdiff of differentiating circuit 5 is greater than voltage Vref of power supply 8, voltage adjusting circuit 6 sinks the gate current of power semiconductor element 1.

Figure 3:
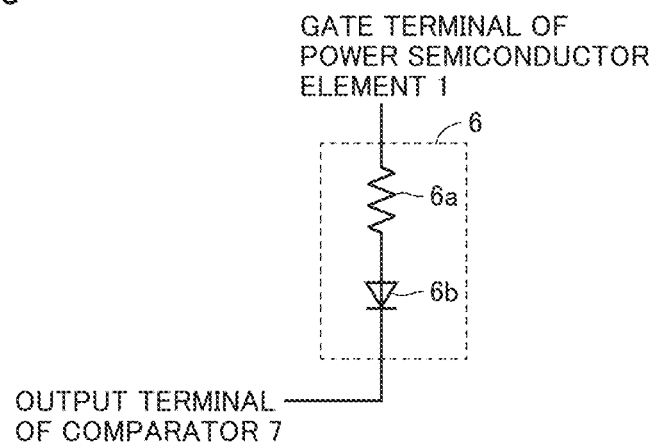
FIG. 3 is a diagram illustrating a configuration of a voltage adjusting circuit 6.

FIG. 3 is a diagram illustrating a configuration of voltage adjusting circuit 6.

Voltage adjusting circuit 6 includes a resistor 6a and a diode 6b connected in series. Resistor 6a has a first end connected to the gate terminal of power semiconductor element 1 and a second end connected to the anode of diode 6b. Diode 6b has an anode connected to the second end of resistor 6a and a cathode connected to the output terminal of comparator 7.

The resistance of resistor 6a limits current flowing through diode 6b, whereby the ability of sinking the gate current of power semiconductor element 1 is adjusted. When output voltage Vout of comparator 7 is at HIGH level, voltage adjusting circuit 6 does not operate. Here, the magnitude of voltage Vout at HIGH level is the same as the magnitude of gate voltage Vg of power semiconductor element 1 when power semiconductor element 1 is in the ON state. When output voltage Vout of comparator 7 is at LOW level, voltage adjusting circuit 6 operates. The magnitude of voltage Vout at LOW level is the same as the magnitude of reference potential Vss.

Output voltage Vout of comparator 7 that determines whether voltage adjusting circuit 6 is to operate is not necessarily a voltage equal to gate voltage Vg of power semiconductor element 1 in the ON state, or reference potential Vss. When it is desired to operate voltage adjusting circuit 6, voltage A is applied to both ends of voltage adjusting circuit 6 so that a current value set by the resistance of resistor 6a flows through diode 6b. When it is not desired to operate voltage adjusting circuit 6, voltage B is applied to both ends of voltage adjusting circuit 6 so that current does not flow through diode 6b.

Figure 4:
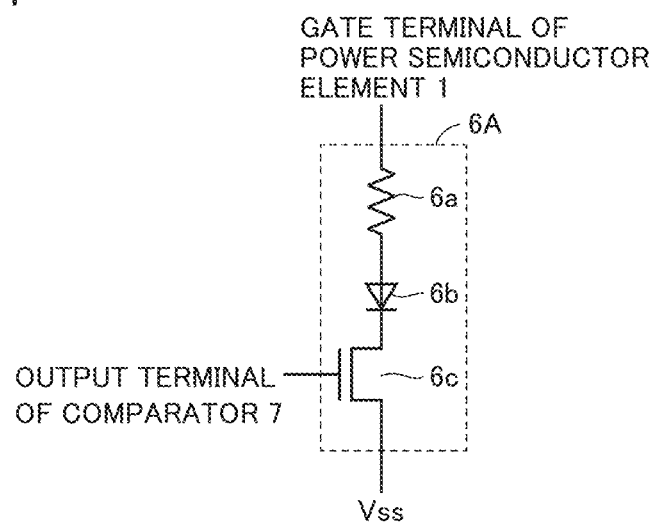
FIG. 4 is a diagram illustrating a configuration of a voltage adjusting circuit 6A.

The configuration of voltage adjusting circuit 6 in FIG. 3 is an example. FIG. 4 is a diagram illustrating a configuration of a voltage adjusting circuit 6A. Voltage adjusting circuit 6A illustrated in FIG. 4 may be used instead of voltage adjusting circuit 6 in FIG. 3.

Voltage adjusting circuit 6A includes a resistor 6a, a diode 6b, and an NMOS transistor 6c connected in series. Resistor 6a has a first end connected to the gate terminal of power semiconductor element 1 and a second end connected to the anode of diode 6b, Diode 6b has an anode connected to the second end of resistor 6a and a cathode connected to the drain of NMOS transistor 6c. NMOS transistor 6c has a drain connected to the cathode of diode 6b, a source connected to reference potential Vss, and a gate connected to the output terminal of comparator 7.

As described above, in the configuration of voltage adjusting circuit 6 illustrated in FIG. 3, output voltage Vout of the comparator is the same potential as gate voltage Vg of power semiconductor element 1, or reference potential. Vss. Thus, for example, when gate voltage Vg of power semiconductor element 1 is 15 V, comparator 7 also needs to output a voltage of 15 V. Thus, a semiconductor element (for example, a bipolar transistor or a power MOSFET) capable of outputting a voltage of 15 V is required. On the other hand, when comparator 7 is composed of an element in a general CMOS process with an output voltage of 5 V, size reduction and lower power consumption can be achieved. However, the potential difference between output voltage Vout of comparator 7 and gate voltage Vg of power semiconductor element 1 illustrated in FIG. 3 is 10 V, and this causes a problem in which voltage adjusting circuit 6 operates when output voltage Vout of comparator 7 is at HIGH level.

Voltage adjusting circuit 6A illustrated in FIG. 4 can solve such a problem. Since comparator 7 can be composed of a semiconductor element in a general CMOS process because of the addition of NMOS transistor 6c, size reduction and lower consumption of comparator 7 can be achieved.

Referring to FIG. 1 again, comparator 7 has a negative input terminal connected to the output terminal of differentiating circuit 5 and switch 9 and a positive input terminal connected to voltage Vref of power supply 8.

When output voltage Vdiff of differentiating circuit 5 is greater than voltage Vref of power supply 8, output voltage Vout of comparator 7 goes to LOW level (reference potential Vss described above). At this time, voltage adjusting circuit 6 operates.

When output voltage Vdiff of differentiating circuit 5 is smaller than voltage Vref of power supply 8, output voltage Vout of comparator 7 goes to HIGH level (gate voltage Vg of power semiconductor element 1 described above). At this time, voltage adjusting circuit 6 does not operate.

Switch 9 is connected between the negative input terminal of comparator 7 and reference potential. Vss. Switch 9 is selectively ON or OFF by an external select signal SL. Whether voltage adjusting circuit 6 is to operate or not can be selected by controlling switch 9.

When switch 9 is ON, the voltage at the negative input terminal of comparator 7 is reference potential Vss, so that output voltage Vout of comparator 7 goes to HIGH level. As a result, voltage adjusting circuit 6 does not operate. When switch 9 is OFF, comparator 7 outputs a comparison result based on output voltage Vdiff of differentiating circuit 5. Voltage adjusting circuit 6 is controlled based on output voltage Vout representing a comparison result.

Figure 5:
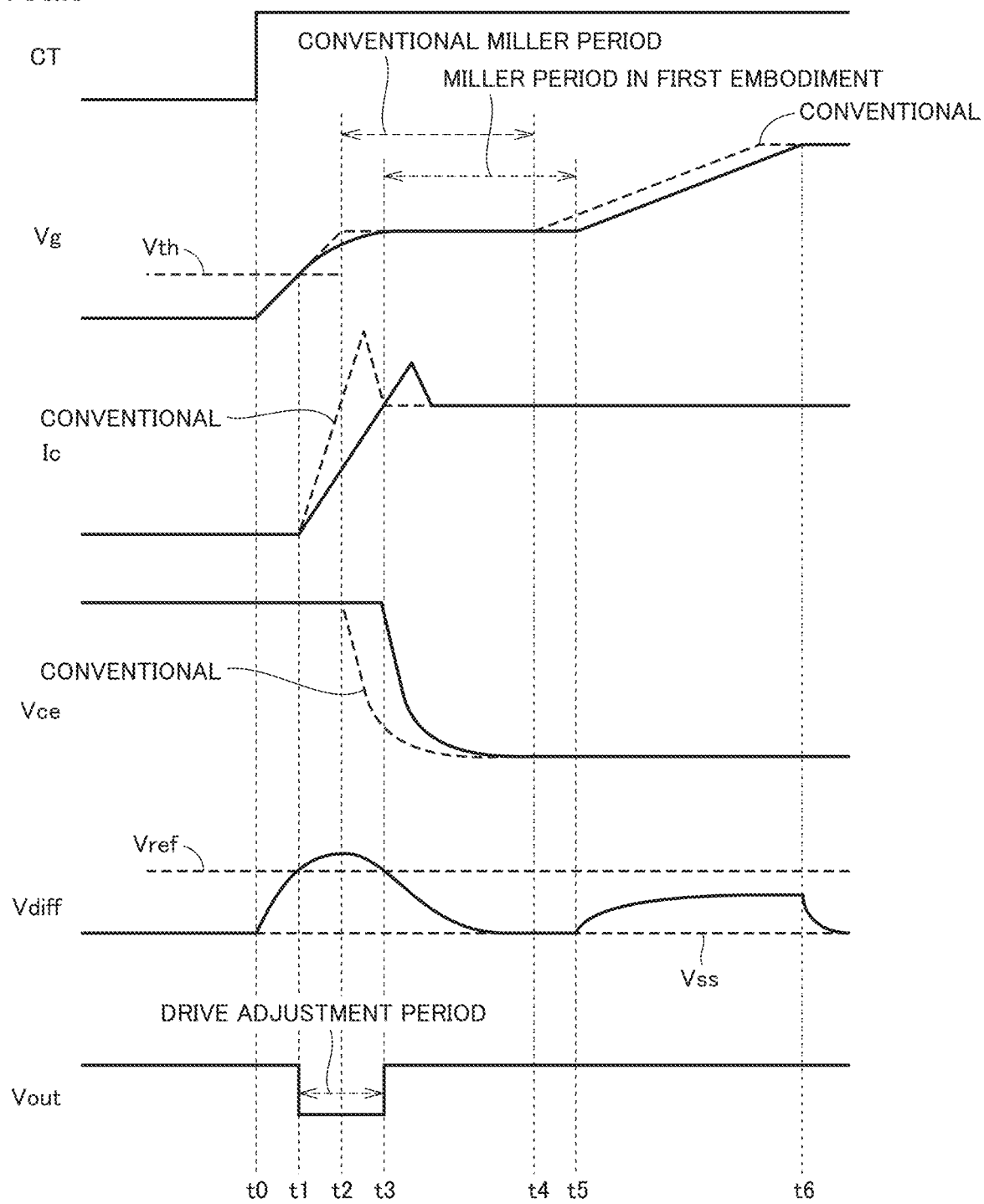
FIG. 5 is a diagram for explaining the operation of drive adjustment circuit 1000 for a power semiconductor element according to the first embodiment.

FIG. 5 is a diagram for explaining the operation of drive adjustment circuit 1000 for a power semiconductor element according to the first embodiment. In FIG. 5, the solid lines indicate the operation of the present embodiment and the broken lines indicate the operation of a conventional example. In the conventional example, drive adjustment circuit 1000 is not provided. In the present embodiment, it is assumed that switch 9 is set OFF.

At time t0, when control signal CT switches from LOW level to HIGH level, drive circuit 3 and gate resistor 4 allow gate voltage Vg of power semiconductor element 1 to start rising and output voltage Vdiff of differentiating circuit 5 to start rising.

At time t1, when gate voltage Vg exceeds a threshold voltage of power semiconductor element 1, collector current Ic of power semiconductor element 1 starts flowing. When output voltage Vdiff of differentiating circuit 5 exceeds voltage Vref of power supply 8, output voltage Vout of comparator 7 falls from HIGH level to LOW level. Thus, voltage adjusting circuit 6 operates. With the operation of voltage adjusting circuit 6, voltage adjusting circuit 6 sinks the gate current of power semiconductor element 1. As a result, the rise of gate voltage Vg in the present embodiment is gentler than the rise of gate voltage Vg in the conventional example, and the rate of change of collector current Ic in the present embodiment is also smaller than the rate of change of collector current Ic in the conventional example. The time when gate voltage Vg exceeds threshold voltage Vth and the time when output voltage Vdiff of differentiating circuit 5 exceeds the reference voltage to cause voltage adjusting circuit 6 to operate are not necessarily the same time. These times can be set as desired by changing voltage Vref of power supply 8.

At time t2, in the conventional example, the Miller period of power semiconductor element 1 starts and gate voltage Vg becomes constant. Collector current Ic in the conventional example attains a current value determined by the load of the circuit or the like. In the conventional example, simultaneously with the start of the Miller period of power semiconductor element 1, collector-emitter voltage Vce of power semiconductor element 1 starts decreasing. Since gate voltage Vg rises more gently in the present embodiment than in the conventional example, at time t2, the Miller period of power semiconductor element 1 is not yet started.

At time t3, in the present embodiment, the Miller period of power semiconductor element 1 starts and gate voltage Vg becomes constant. Collector current Ic attains a current value determined by the load of the circuit or the like. After time t3, the surge current of collector current Ic reaches a peak value. In the present embodiment, since the current change of collector current Ic is controlled more gently than the rate of current change of collector current Ic in the conventional example, through the operation of voltage adjusting circuit 6, the surge current of collector current Ic is reduced in the present embodiment compared with the conventional example. Further, at time t3, in the present embodiment, since the Miller period of power semiconductor element 1 is started, collector-emitter voltage Vce of power semiconductor element 1 starts decreasing. In the present embodiment, since the rise of gate voltage Vg is controlled gently through the operation of voltage adjusting circuit 6, output voltage Vdiff of differentiating circuit 5 is smaller than voltage Vref. As a result, output voltage Vout of comparator 7 rises from LOW level to HIGH level, so that the operation of voltage adjusting circuit 6 ends. The time when the Miller period starts and the time when the operation of voltage adjusting circuit 6 ends are not necessarily the same time. These an be set as desired by changing voltage Vref of power supply 8.

At time t4, in the conventional example, the Miller period of power semiconductor element 1 ends and gate voltage Vg rises. The decrease of collector-emitter voltage Vce ends. In the present embodiment, the Miller period of power semiconductor element 1 does not yet end.

At time t5, in the present embodiment, the Miller period of power semiconductor element 1 ends and gate voltage Vg rises. The decrease of collector-emitter voltage Vce ends. Since the length of Miller period is the same in the present embodiment and in the conventional example, the rate of change of collector-emitter voltage Vce is the same in the present embodiment and in the conventional example.

At time t6, in the present embodiment, gate voltage Vg is completely in the ON state (HIGH level). It is noted that voltage Vref of power supply 8 needs to be set as appropriate such that the rate of change of gate voltage Vg from time t5 to time t6 is smaller than the rate of change of gate voltage Vg from time t0 to time t1 and voltage adjusting circuit 6 does not operate in the period from time t5 to time t6.

Figure 6:
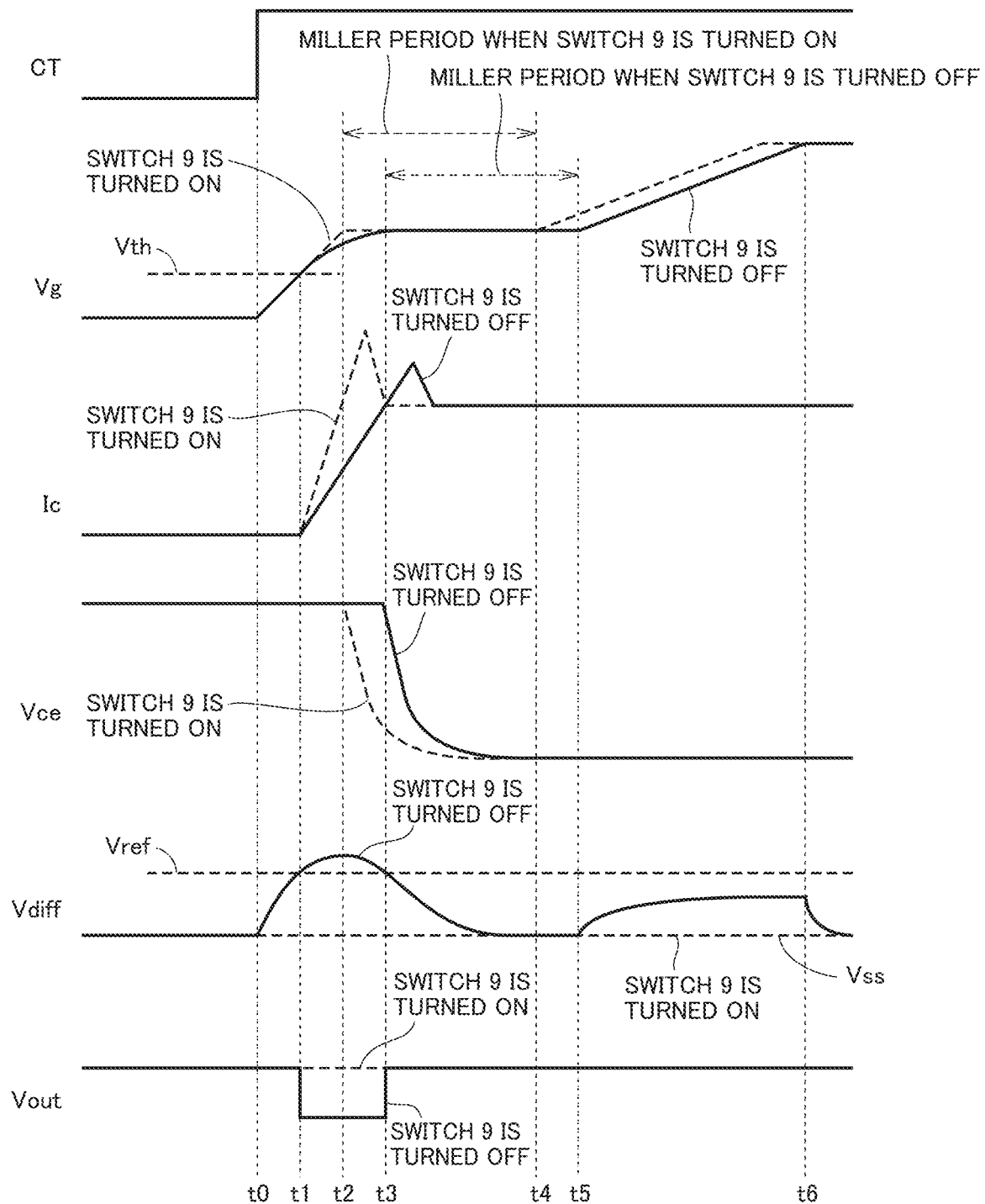
FIG. 6 is a diagram illustrating operation waveforms when a switch 9 is turned ON and when it is turned OFF in drive adjustment circuit 1000 for a power semiconductor element according to the first embodiment.

FIG. 6 is a diagram illustrating an operation waveform when switch 9 is turned ON and when it is turned OFF in drive adjustment circuit 1000 for a power semiconductor element according to the first embodiment.

When switch 9 is turned ON by external select signal SL, voltage adjusting circuit 6 keeps the non-operating state, and when switch 9 is turned OFF, voltage adjusting circuit 6 can be controlled.

When switch 9 is turned ON, that is, when voltage adjusting circuit 6 is set to the non-operating state, voltage Vdiff at the negative input terminal of comparator 7 reaches reference potential Vss, so that output voltage Vout of comparator 7 goes to HIGH level. When voltage adjusting circuit 6 is set to the non-operating state, the waveforms of gate voltage Vg, collector current Ic, and collector-emitter voltage Vce become the same as the waveforms in conventional example illustrated in FIG. 5.

The ON/OFF of switch 9 can be selected timely in accordance with the operation by checking the operation of power semiconductor element 1 in use in advance. The operating status of power semiconductor element 1 may be monitored and switch 9 may be set to operate in accordance with the determination result of the operating state.

As described above, according to the first embodiment, only the rate of change of collector current Ic is adjusted by controlling gate voltage Vg in the transition operation from the OFF state to the ON state of power semiconductor element 1, and the rate of change of collector-emitter voltage Vce is approximately equal to that in the conventional example. As a result, the surge current of collector current Ic can be reduced. In the present embodiment, breakdown due to surge current is suppressed, and in addition, increase in switching loss can be suppressed compared with when collector current Ic and the rate of change of collector-emitter voltage Vce are adjusted simultaneously as in the conventional example.

Second Embodiment

Figure 7:
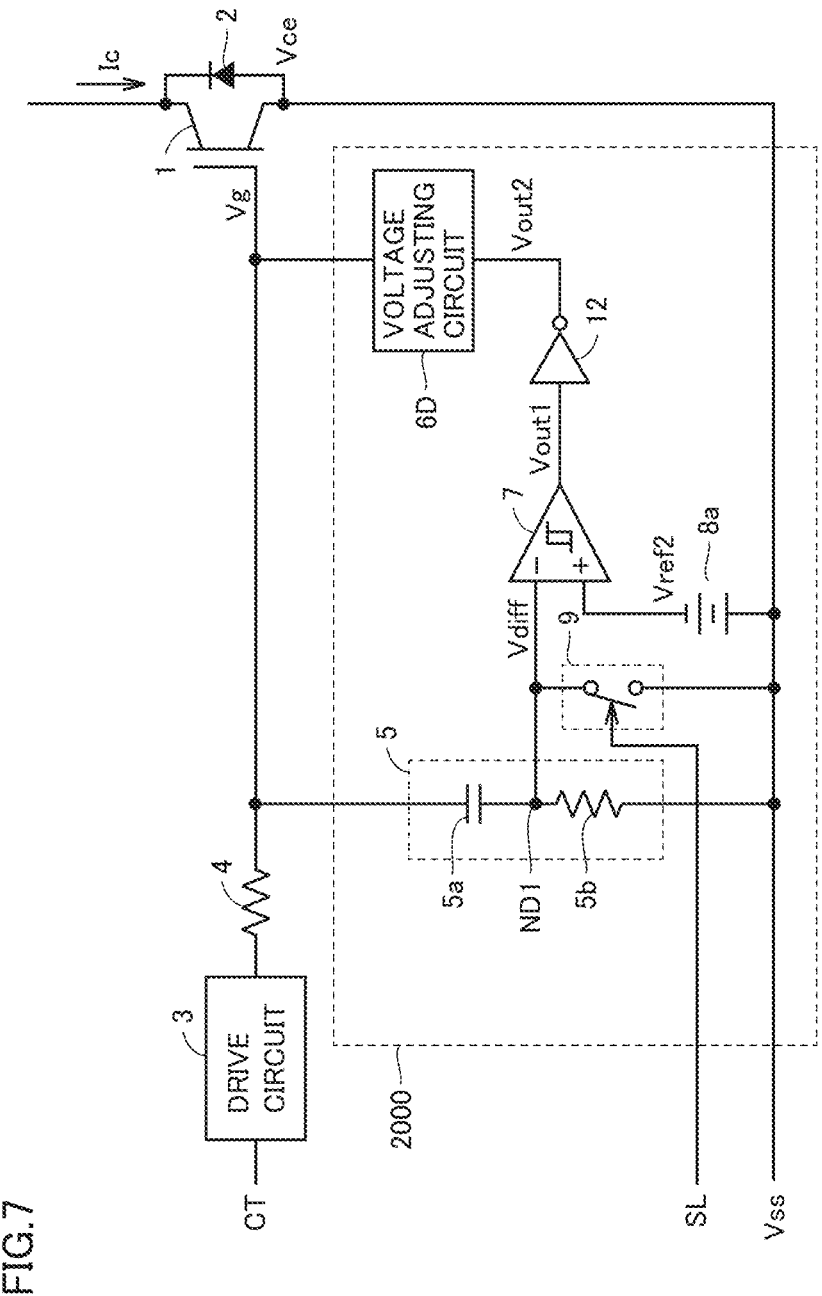
FIG. 7 is a diagram illustrating a drive adjustment circuit 2000 for a power semiconductor element according to a second embodiment.

FIG. 7 is a diagram illustrating a drive adjustment circuit 2000 for a power semiconductor element according to a second embodiment. Drive adjustment circuit 2000 illustrated in FIG. 7 differs from drive adjustment circuit 1000 in the first embodiment illustrated in FIG. 1 in the following points.

Drive adjustment circuit 2000 in FIG. 7 includes a power supply 8a instead of power supply 8 and a voltage adjusting circuit 6D instead of voltage adjusting circuit 6, and includes an inverting circuit 12 between the output of comparator 7 and voltage adjusting circuit 6.

Since the polarity of power supply 8a is opposite to the polarity of power supply 8 of drive adjustment circuit 1000 in the first embodiment, a voltage Vref2 of power supply 8a is lower than reference potential Vss.

Inverting circuit 12 inverts output voltage Vout1 of comparator 7 and outputs a voltage Vout2. When output voltage Vout2 is at LOW level, voltage adjusting circuit 6 operates, and when output voltage Vout2 is at HIGH level, voltage adjusting circuit 6 does not operate.

Instead of inverting circuit 12, a signal with a polarity inverted inside comparator 7 may be output. Alternatively, the input of the positive input terminal and the input of the negative input terminal of comparator 7 may be interchanged.

Voltage adjusting circuit 6D receives output voltage Vout2 of inverting circuit 12 and adjusts gate voltage Vg of power semiconductor element 1. Voltage adjusting circuit 6D has the function of sinking the gate current of power semiconductor element 1. When comparator 7 indicates that output voltage Vdiff of differentiating circuit 5 is smaller than Vref, voltage adjusting circuit 6D sinks the gate current of power semiconductor element 1.

Figure 8:
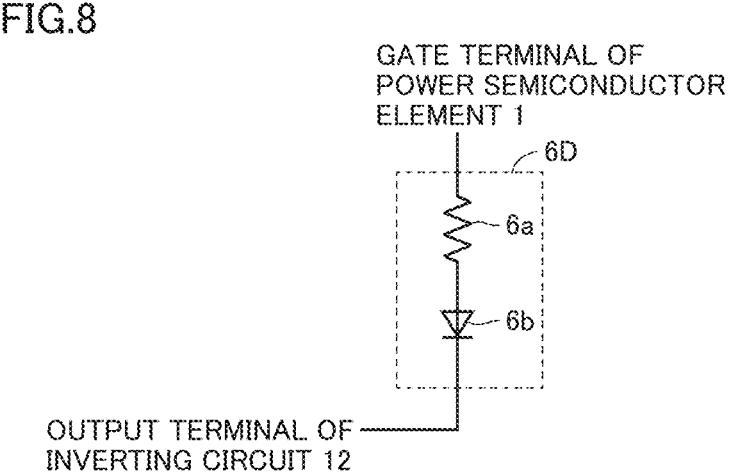
FIG. 8 is a diagram illustrating a configuration of a voltage adjusting circuit 6D.

FIG. 8 is a diagram illustrating a configuration of voltage adjusting circuit 6D.

Voltage adjusting circuit 6D includes a resistor 6a and a diode 6b connected in series. Resistor 6a has a first end connected to the gate terminal of power semiconductor element 1 and a second end connected to the anode of diode 6b. Diode 6b has an anode connected to the second end of resistor 6a and a cathode connected to the output terminal of inverting circuit 12.

The resistance of resistor 6a limits current flowing through diode 6b, whereby the ability of sinking the gate current of power semiconductor element 1 is adjusted, in the same manner as in the first embodiment. When output voltage Vout1 of comparator 7 is at LOW level and output voltage Vout2 of inverting circuit 12 is at HIGH level, voltage adjusting circuit 6 does not operate. Here, the magnitude of voltage Vout2 at HIGH level is the same as the magnitude of gate voltage Vg of power semiconductor element 1 when power semiconductor element 1 is in the ON state. When output voltage Vout1 of comparator 7 is at HIGH level and output voltage Vout2 of inverting circuit 12 is at LOW level, voltage adjusting circuit 6 operates. The magnitude of voltage Vout2 at LOW level is the same as the magnitude of reference potential Vss.

Figure 9:
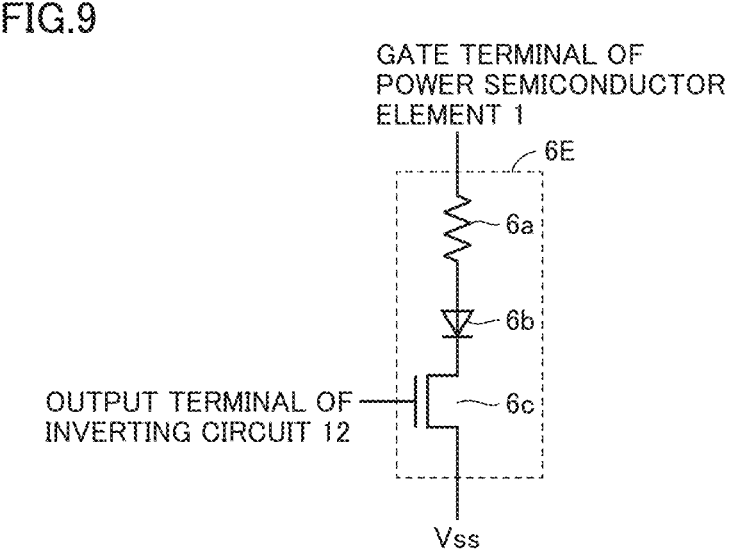
FIG. 9 is a diagram illustrating a configuration of a voltage adjusting circuit 6E.

The configuration of voltage adjusting circuit 6D in FIG. 8 is an example. FIG. 9 is a diagram illustrating a configuration of a voltage adjusting circuit 6E Voltage adjusting circuit 6E illustrated in FIG. 9 may be used instead of voltage adjusting circuit 6D in FIG. 8.

Voltage adjusting circuit 6E includes a resistor 6a, a diode 6b, and an NMOS transistor 6c connected in series. Resistor 6a has a first end connected to the gate terminal of power semiconductor element 1 and a second end connected to the anode of diode 6. Diode 6b has an anode connected to the second end of resistor 6a and a cathode connected to the drain of NMOS transistor 6c. NMOS transistor 6c has a drain connected to the cathode of diode 6b, a source connected to reference potential Vss, and a gate connected to the output terminal of inverting circuit 12.

When switch 9 is ON, the voltage at the negative input terminal of comparator 7 attains reference potential Vss, comparator 7 outputs LOW level, and inverting circuit 12 outputs HIGH level. As a result, voltage adjusting circuit 6 keeps the non-operating state. When switch 9 is OFF, comparator 7 outputs a comparison result based on output voltage Vdiff of differentiating circuit 5. Voltage adjusting circuit 6 is controlled based on voltage Vout2 obtained by inverting output voltage Vout1 indicating the comparison result.

Figure 10:
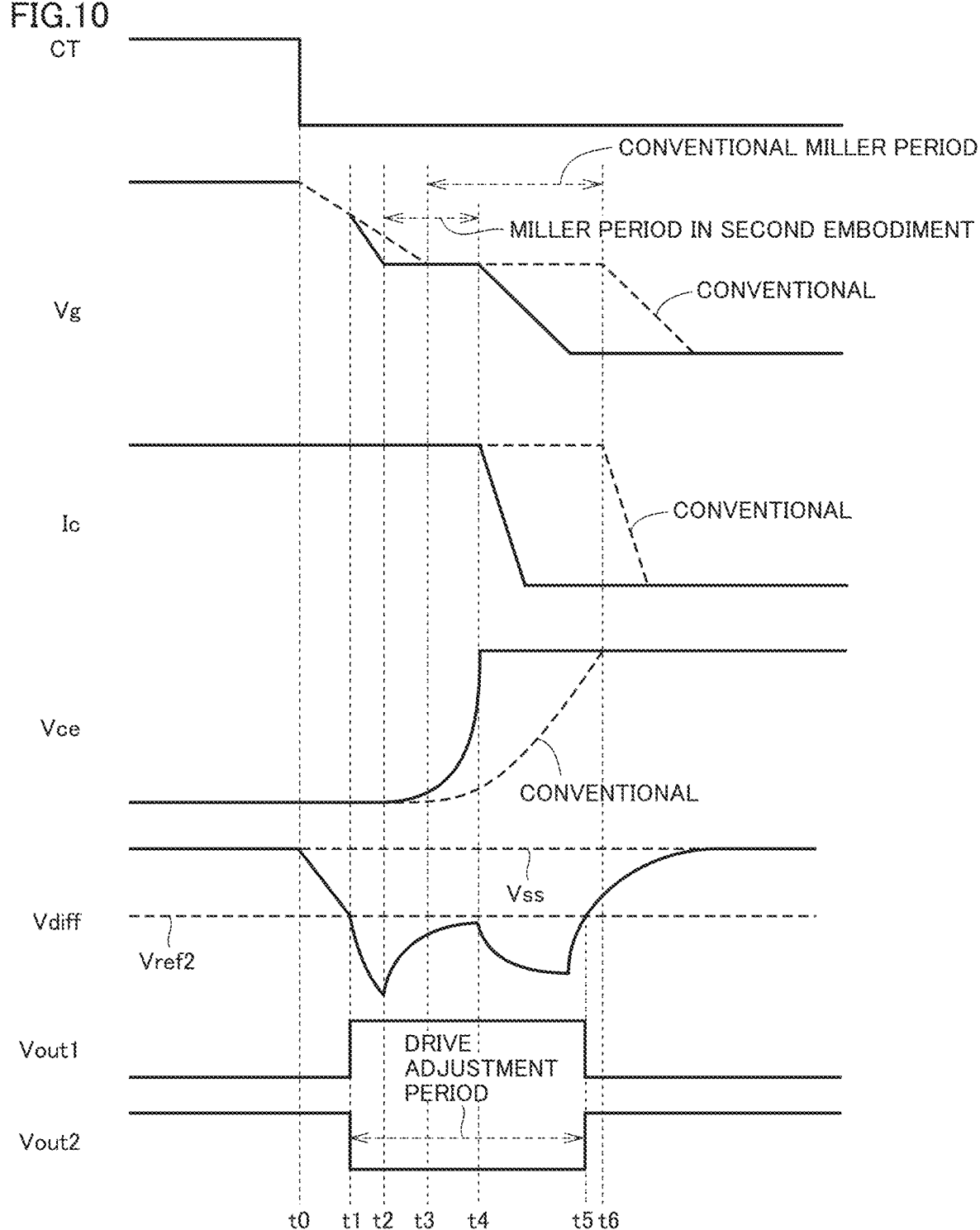
FIG. 10 is a diagram for explaining the operation of drive adjustment circuit 2000 for a power semiconductor element according to the second embodiment.

FIG. 10 is a diagram for explaining the operation of drive adjustment circuit 2000 for a power semiconductor element according to the second embodiment. In FIG. 10, the solid lines indicate the operation of the present embodiment and the broken lines indicate the operation of a conventional example. In the conventional example, drive adjustment circuit 2000 is not provided. In the present embodiment, it is assumed that switch 9 is set OFF.

At time t0, when control signal CT switches from HIGH level to LOW level, drive circuit 3 and gate resistor 4 allow gate voltage Vg of power semiconductor element 1 to start decreasing and output voltage Vdiff of differentiating circuit 5 to start decreasing.

At time t1, when output voltage Vdiff of differentiating circuit 5 becomes smaller than voltage Vref2, output voltage Vout1 of comparator 7 rises from LOW level to HIGH level. Thus, output voltage Vout2 of inverting circuit 12 falls from HIGH level to LOW level, so that voltage adjusting circuit 6 operates. With the operation of voltage adjusting circuit 6, voltage adjusting circuit 6 sinks the gate current of power semiconductor element 1. As a result, the decrease of gate voltage Vg in the present embodiment is faster than the decrease of gate voltage Vg in the conventional example (the time rate of change is increased).

At time t2, due to the effect of voltage adjusting circuit 6 operated, in the present embodiment, the Miller period of power semiconductor element 1 starts and gate voltage Vg becomes constant. In the present embodiment, simultaneously with the start of the Miller period of power semiconductor element 1, collector-emitter voltage Vce of power semiconductor element 1 starts increasing. Since the conventional example does not have the function of sinking the gate current by voltage adjusting circuit 6, the Miller period of power semiconductor element 1 is not yet started.

At time t3, in the conventional example, when the Miller period of power semiconductor element 1 is started, collector-emitter voltage Vce starts increasing.

At time t4, in the present embodiment, since the gate current is sunk in the operation of voltage adjusting circuit 6 from the point of time t1, the Miller period of power semiconductor element 1 ends at an earlier timing than in the conventional example. In the present embodiment, at the timing when the Miller period of power semiconductor element 1 ends, the change of collector-emitter voltage Vce also ends, and collector current Ic starts changing.

At time t5, when output voltage Vdiff of differentiating circuit 5 becomes greater than voltage Vref2, output voltage Vout1 of comparator 7 falls from HIGH level to LOW level. Thus, output voltage Vout2 of inverting circuit 12 rises from LOW level to HIGH level, so that the operation of voltage adjusting circuit 6 ends.

At time t6, in the conventional example, the Miller period of power semiconductor element 1 ends, the change of collector-emitter voltage Vce ends, and collector current Ic starts changing.

From time t2 to time t6, the rate of change of collector-emitter voltage Vce in the present embodiment is greater than the rate of change of collector-emitter voltage Vce in the conventional example.

After time t4, although voltage adjusting circuit 6 is operating, the voltage between the gate terminal of power semiconductor element 1 connected to voltage adjusting circuit 6 and the output terminal of inverting circuit 12 is reduced, and therefore the ability of sinking the gate current in voltage adjusting circuit 6 is gradually reduced. As a result, the time rate of change of collector current Ic in the present embodiment is substantially the same as the time rate of change of collector current Ic in the conventional example.

As described above, according to the second embodiment, the rate of change of collector-emitter voltage Vce is adjusted by controlling gate voltage Vg in the transition operation from the ON state to the OFF state of power semiconductor element 1. Since the rate of change of collector current Ic in the present embodiment is substantially the same degree as the rate of change of collector current Ic in the conventional example, the switching loss can be reduced more in the present embodiment than in the conventional example. Although not illustrated in the drawings, it is necessary to set the ability of sinking the gate current as appropriate, because increasing the rate of change of collector-emitter voltage Vce increases the surge voltage of collector-emitter voltage Vce. The ability of sinking the gate current can be set by the resistance of resistor 6a in voltage adjusting circuit 6D, 6E illustrated in FIG. 8, FIG. 9.

Third Embodiment

Figure 11:
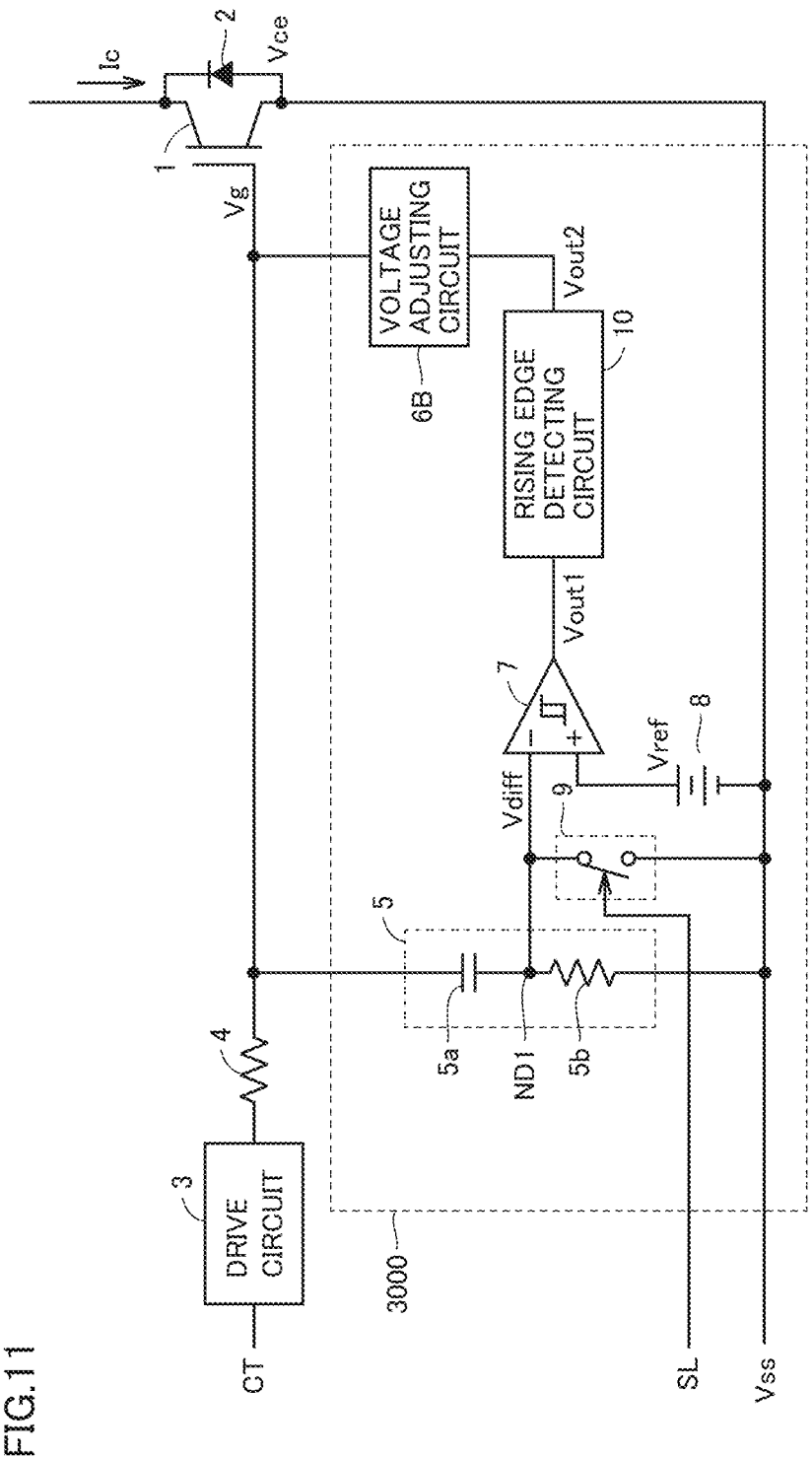
FIG. 11 is a diagram illustrating a drive adjustment circuit 3000 for a power semiconductor element according to a third embodiment.

FIG. 11 is a diagram illustrating a drive adjustment circuit 3000 for a power semiconductor element according to a third embodiment. Drive adjustment circuit 3000 illustrated in FIG. 11 differs from drive adjustment circuit 1000 in the first embodiment illustrated in FIG. 1 in the following points.

Drive adjustment circuit 3000 includes a rising edge detecting circuit 10 and includes a voltage adjusting circuit 6B instead of voltage adjusting circuit 6.

Rising edge detecting circuit 10 detects a rising edge of output voltage Vout1 of comparator 7 and outputs a detection signal Vout2 to voltage adjusting circuit 6.

Figure 12:
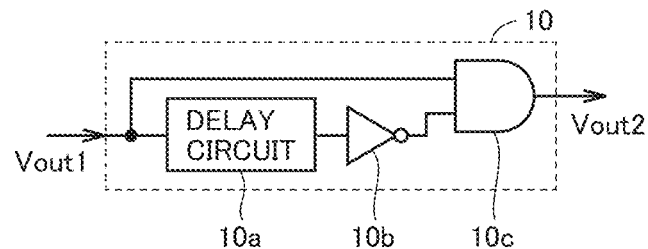
FIG. 12 is a diagram illustrating a configuration example of a rising edge detecting circuit 10.

FIG. 12 a diagram illustrating a configuration example of rising edge detecting circuit 10.

Rising edge detecting circuit 10 includes a delay circuit 10a, an inverting circuit 10b, and an AND circuit 10c. Delay circuit 10a delays output voltage Vout1 of comparator 7 by a setting time. Inverting circuit 10b inverts the output of delay circuit 10a. AND circuit 10c outputs the AND of output voltage Vout1 of comparator 7 and the output of inverting circuit 10b as detection signal Vout2. Rising edge detecting circuit 10 outputs detection signal Vout2 that goes to HIGH level only for the setting time of delay circuit 10a from the rising edge of output voltage Vout1 of comparator 7.

Voltage adjusting circuit 6B has the function of supplying current to the gate terminal of power semiconductor element 1, rather than the function of sinking the gate current of the gate terminal of power semiconductor element 1. When comparator 7 and rising edge detecting circuit 10 indicate that output voltage Vdiff of differentiating circuit 5 has changed from a state larger than Vref to a smaller state, voltage adjusting circuit 6B supplies current to the gate terminal of power semiconductor element 1 for the setting time.

Figure 13:
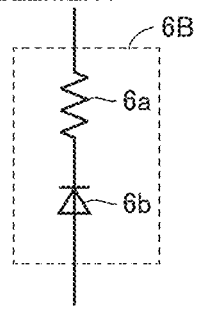
FIG. 13 is a diagram illustrating a configuration of a voltage adjusting circuit 6B.

FIG. 13 is a diagram illustrating a configuration of voltage adjusting circuit 6B.

Voltage adjusting circuit 6B includes a resistor 6a and a diode 6b connected in series. Resistor 6a has a first end connected to the gate terminal of power semiconductor element 1 and a second end connected to the cathode of diode 6b. Diode 6b has a cathode connected to the second end of resistor 6a and an anode connected to the output terminal of rising edge detecting circuit 10. Diode 6b is connected in a direction to supply current to the gate terminal of power semiconductor element 1.

The resistance of resistor 6a limits current flowing through diode 6b, whereby the ability of supplying current to the gate of power semiconductor element 1 is adjusted.

When it is desired to operate voltage adjusting circuit 6B, voltage A is applied to both ends of voltage adjusting circuit 6B so that a current value set by the resistance of resistor 6a flows through diode 6b. When it is not desired to operate voltage adjusting circuit 6B, voltage B is applied to both ends of voltage adjusting circuit 6B so that current does not flow through diode 6b.

Figure 14:
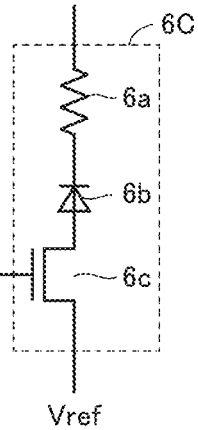
FIG. 14 is a diagram illustrating a configuration of a voltage adjusting circuit 6C.

The configuration of voltage adjusting circuit 6B in FIG. 13 is an example. FIG. 14 is a diagram illustrating a configuration of a voltage adjusting circuit 6C. Voltage adjusting circuit 6C illustrated in FIG. 14 may be used instead of voltage adjusting circuit 6B in FIG. 13.

Voltage adjusting circuit 6C includes a resistor 6a, a diode 6b, and an NMOS transistor 6c connected in series. Resistor 6a has a first end connected to the gate terminal of power semiconductor element 1 and a second end connected to the cathode of diode 6b. Diode 6b has a cathode connected to the second end of resistor 6a and an anode connected to the drain of NMOS transistor 6c. NMOS transistor 6c has a drain connected to the anode of diode 6b, a source connected to voltage Vref of power supply 8, and a gate connected to the output terminal of rising edge detecting circuit 10.

When switch 9 is ON, the voltage at the negative input terminal of comparator 7 attains reference potential Vss, and comparator 7 outputs HIGH level. At this time, rising edge detecting circuit 10 outputs LOW level. As a result, voltage adjusting circuit 6 keeps the non-operating state.

When switch 9 is OFF, comparator 7 outputs a comparison result based on output voltage Vdiff of differentiating circuit 5. At this time, voltage adjusting circuit 6 is controlled based on the output result of rising edge detecting circuit 10.

Figure 15:
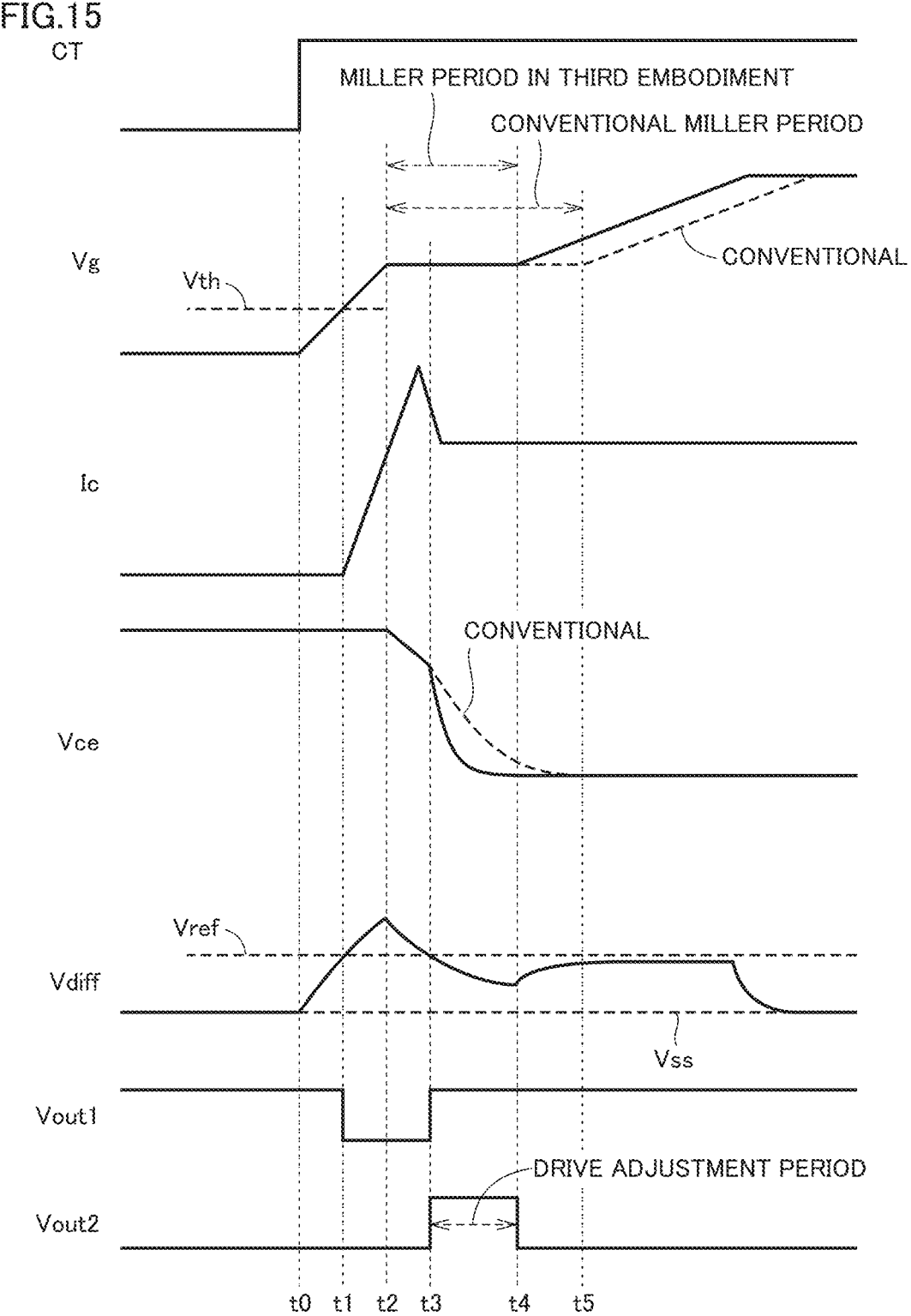
FIG. 15 is a diagram illustrating the operation of drive adjustment circuit 3000 for a power semiconductor element according to the third embodiment.

FIG. 15 is a diagram illustrating the operation of drive adjustment circuit 3000 for a power semiconductor element according to the third embodiment. In FIG. 15, the solid lines indicate the operation of the present embodiment and the broken lines indicate the operation of a conventional example. In the conventional example, drive adjustment circuit 3000 is not provided. In the present embodiment, it is assumed that switch 9 is set OFF.

At time t0, when control signal CT switches from LOW level to HIGH level, drive circuit 3 and gate resistor 4 allow gate voltage Vg of power semiconductor element 1 to start rising and output voltage Vdiff of differentiating circuit 5 to start rising.

At time t1, when gate voltage Vg exceeds threshold voltage Vth of power semiconductor element 1, collector current Ic of the power semiconductor element starts flowing. When output voltage Vdiff of differentiating circuit 5 exceeds voltage Vref of power supply 8, output voltage Vout1 of comparator 7 falls from HIGH level to LOW level. The time when gate voltage Vg exceeds threshold voltage Vth and the time when output voltage Vdiff of differentiating circuit 5 exceeds voltage Vref of power supply 8 are not necessarily the same time. These times can be set as desired by changing voltage Vref of power supply 8.

At time t2, the Miller period of power semiconductor element 1 starts and gate voltage Vg becomes constant. Collector current Ic attains a current value determined by the load of the circuit or the like. Simultaneously with the start of the Miller period of power semiconductor element 1, collector-emitter voltage Vice of power semiconductor element 1 starts decreasing.

At time t3, when output voltage Vdiff of differentiating circuit 5 becomes lower than voltage Vref, output voltage Vout1 of comparator 7 rises from LOW level to HIGH level.

Rising edge detecting circuit 10 detects a rising edge of voltage Vout1, and detection signal Vout2 rises from LOW level to HIGH level. With the operation of rising edge detecting circuit 10, voltage adjusting circuit 6 operates and current is supplied to the gate terminal of power semiconductor element 1. The period in which output voltage Vout1 is at LOW level can be set as desired by changing the magnitude of voltage Vref of power supply 8.

At time t3 to time t4, in the present embodiment, since current is supplied to the gate terminal of power semiconductor element 1 through the operation of voltage adjusting circuit 6, the rate of change of collector-emitter voltage Vce in the present embodiment is greater than the rate of change of collector-emitter voltage Vce in the conventional example.

At time t4, the Miller period of power semiconductor element 1 in the present embodiment ends, and gate voltage Vg rises. The decrease of collector-emitter voltage Vce ends. The timing when the Miller period of power semiconductor element 1 in the present embodiment ends and the timing when detection signal Vout2 of rising edge detecting circuit 10 falls from HIGH level to LOW level are not necessarily the same, and the period of HIGH level of detection signal Vout2 can be set as desired.

At time t5, the Miller period of power semiconductor element 1 in the conventional example ends and gate voltage Vg rises. The change of collector-emitter voltage Vce ends.

In the third embodiment, only the rate of change of collector-emitter voltage Vce in the transition state from the ON state to the OFF state of power semiconductor element 1 is controlled. It is necessary to set the period of LOW level (from time t1 to time t3) of output voltage Vout1 of comparator 7 as appropriate by voltage Vref of power supply 8.

As described above, according to the third embodiment, only the rate of change of collector-emitter voltage Vce is adjusted by controlling gate voltage Vg in the transition operation from the OFF state to the ON state of power semiconductor element 1. The rate of change of collector current Ic in the present embodiment is substantially the same degree as the rate of change of collector current is in the conventional example. Thus, in the present embodiment, the surge current of collector current Ic is substantially the same degree as that in the conventional example, while the switching loss can be reduced.

Fourth Embodiment

Figure 16:
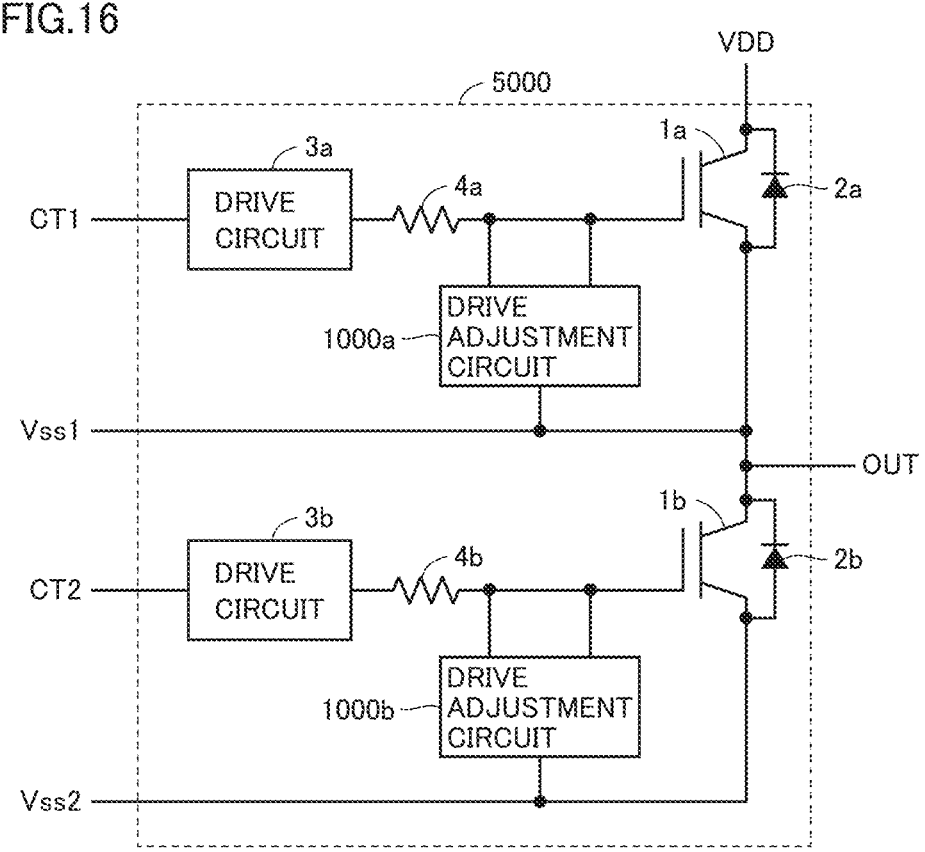
FIG. 16 is a diagram illustrating a configuration of a power module 5000 according to a fourth embodiment.

FIG. 16 is a diagram illustrating a configuration of a power module 5000 according to a fourth embodiment.

Power module 5000 includes power semiconductor elements 1a and 1b, freewheeling diodes 2a and 2b, drive adjustment circuits 1000a and 1000b, drive circuits 3a and 3b, and gate resistors 4a and 4b.

Drive circuit 3a is controlled by a control signal CT1. Drive circuit 3b is controlled by a control signal CT2. The emitter of power semiconductor element 1a is connected to a reference potential Vss1. The emitter of power semiconductor element 1b is connected to a reference potential Vss2.

The collector of power semiconductor element 1a is connected to a power supply VDD. The emitter of power semiconductor element 1a and the collector of power semiconductor element 1b are connected to each other, and the point of connection is connected to an output terminal OUT.

Any of drive adjustment circuits 1000, 2000, and 3000 described in the first to fourth embodiments may be used as drive adjustment circuits 1000a and 1000b.

The power module may include only power semiconductor elements 1a and 1b and drive adjustment circuits 1000a and 1000b, excluding drive circuits 3a and 3b and gate resistors 4a and 4b, and examples of the configuration of the power module is not limited to this. Further, the drive adjustment circuit and the drive circuit may be composed of an integrated circuit.

The power module includes two power semiconductor elements 1a and 1b in the fourth embodiment but may include three or more power semiconductor elements. The power module may include, for example, six power semiconductor elements.

Fifth Embodiment

Figure 17:
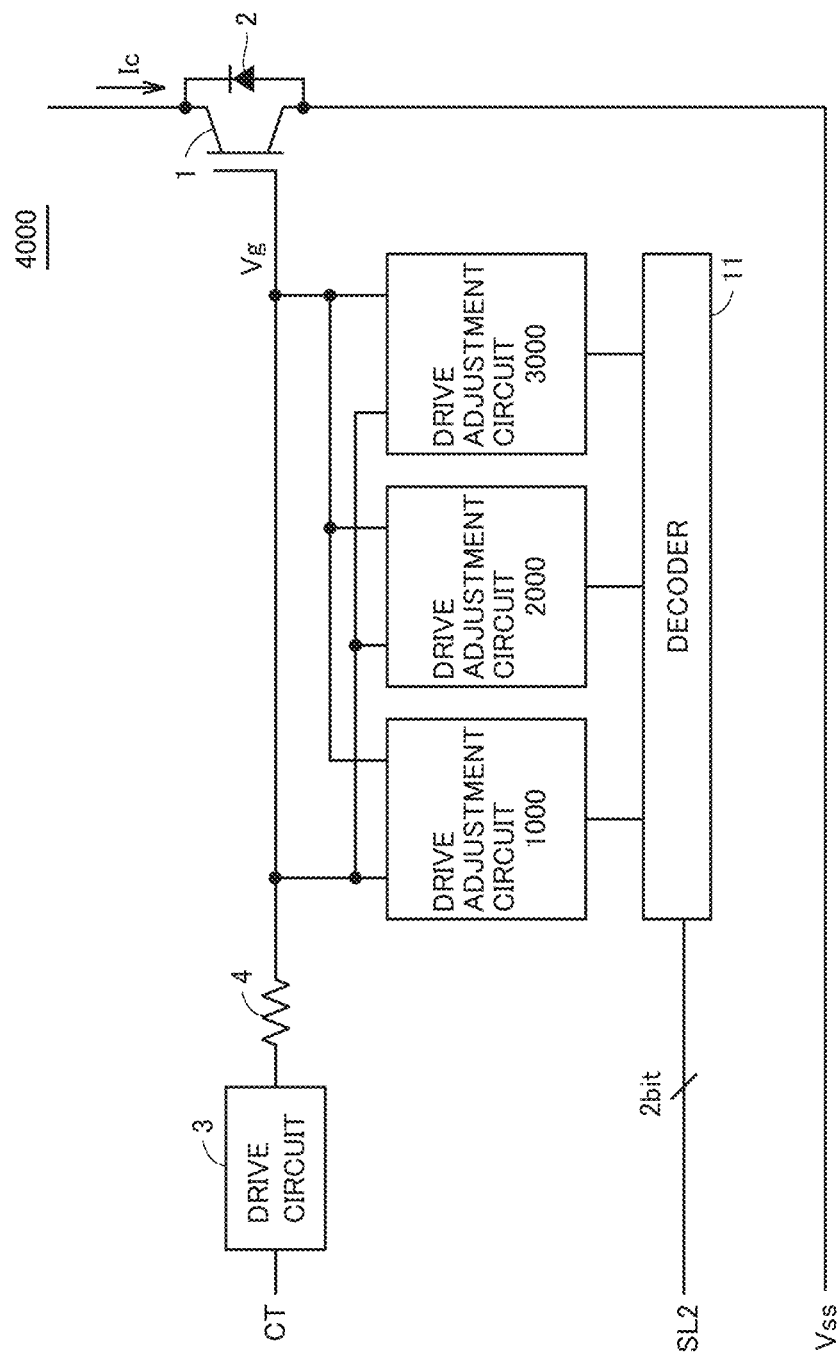
FIG. 17 is a diagram illustrating a configuration of a power module 4000 according to a fifth embodiment.

FIG. 17 is a diagram illustrating a configuration of a power module 4000 according to a fifth embodiment.

Power module 4000 includes a drive circuit 3, a gate resistor 4, drive adjustment circuit 1000 in the first embodiment, drive adjustment circuit 2000 in the second embodiment, drive adjustment circuit 3000 in the third embodiment, and a decoder 11.

Drive adjustment circuit 1000, drive adjustment circuit 2000, and drive adjustment circuit 3000 adjust gate voltage Vg of power semiconductor element 1.

Decoder 11 selects any one of drive adjustment circuit 1000, drive adjustment circuit 2000, and drive adjustment circuit 3000, based on an external select signal SL2.

Only the selected drive adjustment circuit operates to adjust gate voltage Vg of power semiconductor element 1.

Sixth Embodiment

In the present embodiment, the drive adjustment circuit in the foregoing embodiments is applied to a power conversion device. Although the power conversion device in the application is not limited to a specific power conversion device, the application to a three-phase inverter will be described below.

Figure 18:
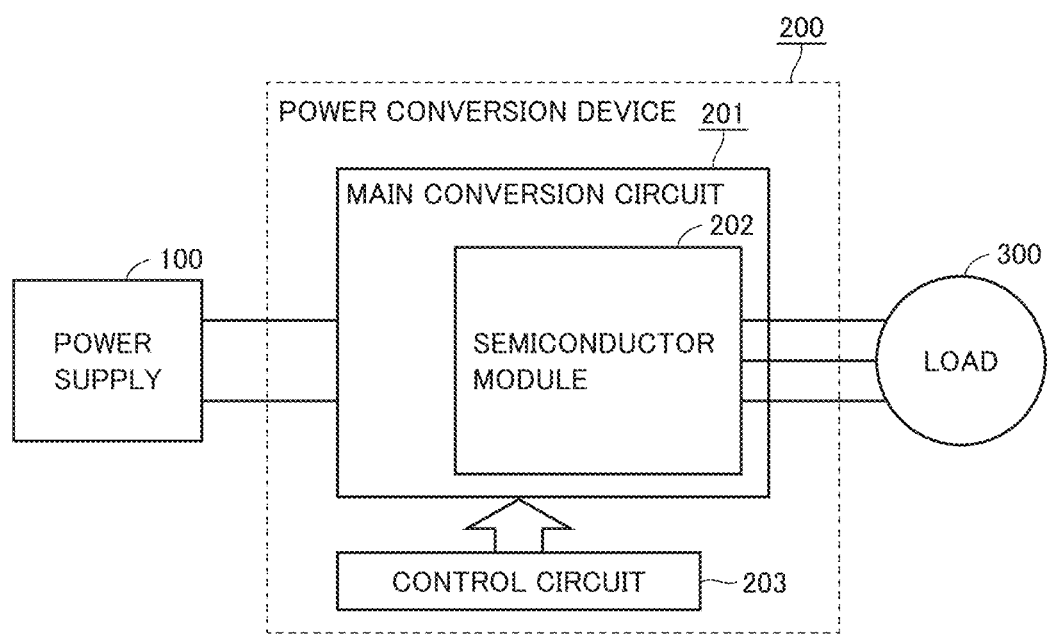
FIG. 18 is a block diagram illustrating a configuration of a power conversion system according to a sixth embodiment.

FIG. 18 is a block diagram illustrating a configuration of a power conversion system according to a sixth embodiment.

The power conversion system includes a power supply 100, a power conversion device 200, and a load 300.

Power supply 100 is a DC power supply and supplies a DC power to power conversion device 200. Power supply 100 can be composed of a variety of kinds. Power supply 100 can be composed of, for example, a DC system, a solar battery, or a storage battery. Power supply 100 may be composed of a rectifier circuit or an AC/DC converter connected to an AC system. Power supply 100 may be composed of a DC/DC converter that converts a DC power output from a DC system into a predetermined power.

Power conversion device 200 is a three-phase inverter connected between power supply 100 and load 300. Power conversion device 200 converts a DC power supplied from power supply 100 into an AC power and supplies the AC power to load 300. Power conversion device 200 includes a main conversion circuit 201 that converts a DC power into an AC power and outputs the AC power, and a control circuit 203 that outputs a control signal for controlling main conversion circuit 201 to main conversion circuit 201.

Load 300 is a three-phase motor driven by an AC power supplied from power conversion device 200. Load 300 is not limited to specific applications and is a motor mounted on a variety of electrical equipment. Load 300 is used as a motor, for example, for hybrid cars, electric cars, railway vehicles, elevators, or air conditioners.

The detail of power conversion device 200 will be described below.

Main conversion circuit 201 includes a power semiconductor element 1 and a freewheeling diode 2. Main conversion circuit 201 switches power semiconductor element 1 to convert a DC power supplied from power supply 100 into an AC power to be supplied to load 300.

Although there are a variety of specific circuit configurations of main conversion circuit 201, main conversion circuit 201 in the present embodiment is a two-level three-phase full bridge circuit.

The two-level three-phase full bridge circuit can be composed of six power semiconductor elements 1 and six freewheeling diodes 2 connected in anti-parallel with the respective power semiconductor elements 1. Power semiconductor elements 1 and freewheeling diodes 2 of main conversion circuit 201 may be composed of a semiconductor module 202. Six power semiconductor elements 1 are connected in series for every two power semiconductor elements 1 to constitute upper and lower arms, and the upper and lower arms constitute each phase (U phase, V phase, W phase) of the full bridge circuit. The output terminals of the upper and lower arms, that is, three output terminals of main conversion circuit 201 are connected to load 300.

Main conversion circuit 201 includes a drive circuit 3 for driving each power semiconductor element 1. Drive circuit 3 may be contained in semiconductor module 202 or may be arranged outside of semiconductor module 202. Drive circuit 3 generates a drive signal for driving power semiconductor element 1 and supplies the generated drive signal to the gate of power semiconductor element 1 of main conversion circuit 201. Specifically, drive circuit 3 outputs a drive signal for driving power semiconductor element 1 to the gate of each power semiconductor element 1 in accordance with a control signal CT from control circuit 203.

Main conversion circuit 201 further includes any one of drive adjustment circuit 1000 in the first embodiment, drive adjustment circuit 2000 in the second embodiment, and drive adjustment circuit 3000 in the third embodiment.

Control circuit 203 controls power semiconductor element 1 of main conversion circuit 201 such that a desired power is supplied to load 300. Specifically, the time (ON time) in which each power semiconductor element 1 of main conversion circuit 201 is to be turned ON is calculated based on a power to be supplied to load 300. For example, main conversion circuit 201 can be controlled by pulse width modulation (PWM) control in which the ON time of power semiconductor element 1 is modulated in accordance with a voltage to be output. Control circuit 203 outputs a control command (control signal CT) to drive circuit 3 such that an ON signal is output to power semiconductor element 1 to be turned ON and an OFF signal is output to power semiconductor element 1 to be turned OFF, at each point of time. Drive circuit 3 outputs the ON signal or the OFF signal as a drive signal to the gate of each power semiconductor element 1, in accordance with this control signal CT.

Since main conversion circuit 201 includes drive adjustment circuit 1000 in the first embodiment, drive adjustment circuit 2000 in the second embodiment, or drive adjustment circuit 3000 in the third embodiment, switching loss can be reduced in the transition operation from the OFF state to the ON state or from the ON state to the OFF state of power semiconductor element 1.

In the present embodiment, the power conversion device to which the drive adjustment circuit in the first to third embodiments is applied is a two-level three-phase inverter. However, the present disclosure is not limited thereto and can be applied to a variety of power conversion devices. For example, the present disclosure may be applied to a three-level or multi-level power conversion device. When a power is supplied to a single-phase load, the power conversion device may be a single-phase inverter. When a power is supplied to a DC load or the like, the power conversion device may be a DC/DC converter or an AC/DC converter.

The power conversion device in the present disclosure is not limited to a case in which the load is a motor, and the load may be, for example, an electric discharge machine, a laser beam machine, an induction heating cooker, or a wireless charging system. The power conversion device in the present disclosure may be used as a power conditioner for a photovoltaic system or a power storage system.

Embodiments disclosed here should be understood as being illustrative rather than being limitative in all respects. The scope of the present disclosure is shown not in the foregoing description but in the claims, and it is intended that all modifications that come within the meaning and range of equivalence to the claims are embraced here.

REFERENCE SIGNS LIST $1a$, $1b$ power semiconductor element, 2, $2a$, $2b$ freewheeling diode, 3, $3a$, $3b$ drive circuit, 4, $4a$, $4b$ gate resistor, 5 differentiating circuit, $5a$ capacitor, $5b$, $5d$, $6a$ resistor, $5c$ operational amplifier, 6, 6A, 6B, 6C, 6D, 6E voltage adjusting circuit, $6b$ diode, $6c$ NMOS transistor, 7 comparator, 8, $8a$ power supply, 9 switch, 10 rising edge detecting circuit, 11 decoder, $10b$, 12 inverting circuit, 100 power supply, 200 power conversion device, 201 main conversion circuit, 202 semiconductor module, 203 control circuit, 300 load, 1000, 2000, 3000, $1000a$, $1000b$ drive adjustment circuit, 4000, 5000 power module.

The invention claimed is:

1. A drive adjustment circuit for a power semiconductor element, comprising:
a differentiating circuit to differentiate a gate voltage of a power semiconductor element;
a power supply to generate a comparison reference voltage;
a comparator having a first input terminal connected to the differentiating circuit and a second input terminal receiving the comparison reference voltage; and
a voltage adjusting circuit having one terminal connected to a gate terminal of the power semiconductor element and the other terminal connected to an output terminal of the comparator to adjust the gate voltage of the power semiconductor element, based on an output of the comparator, wherein the voltage adjusting circuit has a function of sinking gate current of the power semiconductor element based on an output voltage of the differentiating circuit.

2. The drive adjustment circuit for a power semiconductor element according to claim 1, wherein the voltage adjusting circuit has a function of supplying current to a gate terminal of the power semiconductor element.

3. The drive adjustment circuit for a power semiconductor element according to claim 2, wherein
the comparison reference voltage is greater than a reference potential of the power semiconductor element, and
the voltage adjusting circuit supplies current to the gate of the power semiconductor element when an output voltage of the differentiating circuit changes from a state greater than the comparison reference voltage to a state smaller than the comparison reference voltage.

4. The drive adjustment circuit for a power semiconductor element according to claim 3, further comprising an edge detecting circuit to detect an edge of an output voltage of the comparator, wherein
the voltage adjusting circuit includes a resistor and a diode connected in series,
the resistor has a first end connected to the gate terminal of the power semiconductor element and a second end connected to a cathode of the diode, and
the diode has the cathode connected to the second end of the resistor and an anode connected to an output terminal of the edge detecting circuit.

5. The drive adjustment circuit for a power semiconductor element according to claim 3, further comprising an edge detecting circuit to detect a change in output voltage of the comparator, wherein
the voltage adjusting circuit includes a resistor, a diode, and an NMOS transistor connected in series,
the resistor has a first end connected to the gate terminal of the power semiconductor element and a second end connected to a cathode of the diode,
the diode has the cathode connected to the second end of the resistor and an anode connected to a drain of the NMOS transistor, and
the NMOS transistor has the drain connected to the anode of the diode, a source receiving the comparison reference voltage, and a gate connected to an output terminal of the edge detecting circuit.

6. The drive adjustment circuit for a power semiconductor element according to claim 1, further comprising a switch connected between the first input terminal of the comparator and a reference potential of the power semiconductor element.

7. A power module comprising:
the power semiconductor element;
a drive circuit to drive the power semiconductor element; and
the drive adjustment circuit for a power semiconductor element according to claim 1.

8. A power conversion device comprising:
a main conversion circuit including the power semiconductor element, a drive circuit to drive the power semiconductor element, and the drive adjustment circuit according to claim 1, the main conversion circuit converting an input power and outputting the converted power; and
a control circuit to output a control signal for controlling the main conversion circuit to the main conversion circuit.

9. The drive adjustment circuit for a power semiconductor element according to claim 1, wherein
the comparison reference voltage is greater than a reference potential of the power semiconductor element, and
when an output voltage of the differentiating circuit is greater than the comparison reference voltage, the voltage adjusting circuit sinks gate current of the power semiconductor element.

10. The drive adjustment circuit for a power semiconductor element according to claim 9, wherein
the voltage adjusting circuit includes a resistor and a diode connected in series, the resistor has a first end connected to a gate terminal of the power semiconductor element and a second end connected to an anode of the diode, and the diode has the anode connected to the second end of the resistor and a cathode connected to an output terminal of the comparator.

11. The drive adjustment circuit for a power semiconductor element according to claim 9, wherein
the voltage adjusting circuit includes a resistor, a diode, and an NMOS transistor connected in series,
the resistor has a first end connected to a gate terminal of the power semiconductor element and a second end connected to an anode of the diode,
the diode has the anode connected to the second end of the resistor and a cathode connected to a drain of the NMOS transistor, and
the NMOS transistor has the drain connected to the cathode of the diode, a source connected to the reference potential of the power semiconductor element, and a gate connected to an output terminal of the comparator.

12. A power module comprising:
the power semiconductor element;
a drive circuit to drive the power semiconductor element;
a first drive adjustment circuit being the drive adjustment circuit for a power semiconductor element according to claim 9;
a second drive adjustment circuit comprising:
a differentiating circuit to differentiate a gate voltage of a power semiconductor element;
a power supply to generate a comparison reference voltage;
a comparator having a first input terminal connected to the differentiating circuit and a second input terminal receiving the comparison reference voltage; and
a voltage adjusting circuit to adjust the gate voltage of the power semiconductor element, based on an output of the comparator;
wherein the voltage adjusting circuit has a function of sinking gate current of the power semiconductor element,
the comparison reference voltage is smaller than a reference potential of the power semiconductor element, and
when an output voltage of the differentiating circuit is smaller than the comparison reference voltage, the voltage adjusting circuit sinks gate current of the power semiconductor element,
a third drive adjustment circuit comprising:
a differentiating circuit to differentiate a gate voltage of a power semiconductor element;
a power supply to generate a comparison reference voltage;
a comparator having a first input terminal connected to the differentiating circuit and a second input terminal receiving the comparison reference voltage; and
a voltage adjusting circuit to adjust the gate voltage of the power semiconductor element, based on an output of the comparator,
wherein the voltage adjusting circuit has a function of supplying current to a gate terminal of the power semiconductor element,
the comparison reference voltage is greater than a reference potential of the power semiconductor element, and
the voltage adjusting circuit supplies current to the gate of the power semiconductor element when an output voltage of the differentiating circuit changes from a state greater than the comparison reference voltage to a state smaller than the comparison reference voltage; and
a decoder to select any one of the three drive adjustment circuits in accordance with an external select signal,
wherein the selected drive adjustment circuit adjusts a gate voltage of the power semiconductor element.

13. The drive adjustment circuit for a power semiconductor element according to claim 1, wherein
the comparison reference voltage is smaller than a reference potential of the power semiconductor element, and
when an output voltage of the differentiating circuit is smaller than the comparison reference voltage, the voltage adjusting circuit sinks gate current of the power semiconductor element.

14. The drive adjustment circuit for a power semiconductor element according to claim 13, further comprising an inverting circuit connected to an output terminal of the comparator, wherein
the voltage adjusting circuit includes a resistor and a diode connected in series,
the resistor has a first end connected to a gate terminal of the power semiconductor element and a second end connected to an anode of the diode, and
the diode has the anode connected to the second end of the resistor and a cathode connected to an output terminal of the inverting circuit.

15. The drive adjustment circuit for a power semiconductor element according to claim 13, further comprising an inverting circuit connected to an output terminal of the comparator, wherein
the voltage adjusting circuit includes a resistor, a diode, and an NMOS transistor connected in series,
the resistor has a first end connected to a gate terminal of the power semiconductor element and a second end connected to an anode of the diode,
the diode has the anode connected to the second end of the resistor and a cathode connected to a drain of the NMOS transistor, and
the NMOS transistor has the drain connected to the cathode of the diode, a source connected to a reference potential of the power semiconductor element, and a gate connected to an output terminal of the inverting circuit.

16. A drive adjustment circuit for a power semiconductor element, comprising:
a differentiating circuit to differentiate a gate voltage of a power semiconductor element;
a power supply to generate a comparison reference voltage;
a comparator having a first input terminal connected to the differentiating circuit and a second input terminal receiving the comparison reference voltage; and
a voltage adjusting circuit to adjust the gate voltage of the power semiconductor element, based on an output of the comparator,
wherein the voltage adjusting circuit has a function of sinking gate current of the power semiconductor element,
the comparison reference voltage is greater than a reference potential of the power semiconductor element, and when an output voltage of the differentiating circuit is greater than the comparison reference voltage, the voltage adjusting circuit sinks gate current of the power semiconductor element, the voltage adjusting circuit comprises a first configuration or a second configuration, in the first configuration, the voltage adjusting circuit includes a resistor and a diode connected in series, the resistor having a first end connected to a gate terminal of the power semiconductor element and a second end connected to an anode of the diode, and the diode having the anode connected to the second end of the resistor and a cathode connected to an output terminal of the comparator, in the second configuration, the voltage adjusting circuit includes a resistor, a diode, and an NMOS transistor connected in series, the resistor having a first end connected to a gate terminal of the power semiconductor element and a second end connected to an anode of the diode, the diode having the anode connected to the second end of the resistor and a cathode connected to a drain of the NMOS transistor, and the NMOS transistor having the drain connected to the cathode of the diode, a source connected to the reference potential of the power semiconductor element, and a gate connected to an output terminal of the comparator.

17. The drive adjustment circuit for a power semiconductor element according to claim 16, wherein
the voltage adjusting circuit includes a resistor and a diode connected in series,
the resistor has a first end connected to a gate terminal of the power semiconductor element and a second end connected to an anode of the diode, and
the diode has the anode connected to the second end of the resistor and a cathode connected to an output terminal of the comparator.

18. The drive adjustment circuit for a power semiconductor element according to claim 16, wherein
the voltage adjusting circuit includes a resistor, a diode, and an NMOS transistor connected in series,
the resistor has a first end connected to a gate terminal of the power semiconductor element and a second end connected to an anode of the diode,
the diode has the anode connected to the second end of the resistor and a cathode connected to a drain of the NMOS transistor, and
the NMOS transistor has the drain connected to the cathode of the diode, a source connected to the reference potential of the power semiconductor element, and a gate connected to an output terminal of the comparator.

19. A drive adjustment circuit for a power semiconductor element, comprising:
a differentiating circuit to differentiate a gate voltage of a power semiconductor element;
a power supply to generate a comparison reference voltage;
a comparator having a first input terminal connected to the differentiating circuit and a second input terminal receiving the comparison reference voltage; and
a voltage adjusting circuit to adjust the gate voltage of the power semiconductor element, based on an output of the comparator,
wherein the voltage adjusting circuit has a function of sinking gate current of the power semiconductor element,
the comparison reference voltage is smaller than a reference potential of the power semiconductor element, and
when an output voltage of the differentiating circuit is smaller than the comparison reference voltage, the voltage adjusting circuit sinks gate current of the power semiconductor element.

* * * * *